(12) United States Patent
Fujita (10) Patent No.: US 9,771,077 B2
(45) Date of Patent: Sep. 26, 2017

(54) VEHICLE CONTROL SYSTEM (71) Applicant: DENSO CORPORATION, Kariya, Aichi-pref. (JP)

(72) Inventor: Tatsuya Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/350,225

(22) Filed: Nov. 14, 2016

(65) Prior Publication Data

US 2017/0137030 A1 May 18, 2017

(30) Foreign Application Priority Data

Nov. 13, 2015 (JP) .................................. 2015-223305

(51) Int. Cl.
*B60W 10/02* (2006.01)
*B60W 30/18* (2012.01)
(Continued)

(52) U.S. Cl.
CPC ...... *B60W 30/18072* (2013.01); *B60W 10/02* (2013.01); *B60W 10/06* (2013.01); *F02D 11/02* (2013.01); *F02D 41/123* (2013.01); *F16D 48/06* (2013.01); *B60W 2510/0638* (2013.01); *B60W 2520/10* (2013.01); *B60W 2540/10* (2013.01); *B60W 2540/106* (2013.01); *B60W 2710/021* (2013.01); *B60W 2710/065* (2013.01); *B60W 2710/0655* (2013.01); *F02D 2200/101* (2013.01); *F02D 2200/501* (2013.01);
(Continued)

(58) Field of Classification Search
CPC ........... B60W 30/18072; B60W 10/06; B60W 10/02; B60W 2710/021; B60W 2520/10; B60W 2540/106; B60W 2510/0638; B60W 2710/065; B60W 2510/10; F02D 11/02; F02D 41/123; F02D 2200/101; F02D 2200/501; F16D 48/06; F16D 2500/106; F16D 2500/10412
See application file for complete search history.

(56) References Cited

U.S. PATENT DOCUMENTS 6,254,510 B1 * 7/2001 Rauch ................... B60W 10/06
477/132
8,862,342 B2 * 10/2014 Oguri .................. B60W 30/143
701/1
(Continued)

FOREIGN PATENT DOCUMENTS

| JP | 2013-089134 A | 5/2013 |
| JP | 2013-089136 A | 5/2013 |
| JP | 5304350 B2 | 10/2013 |

*Primary Examiner* — David J Hlavka
(74) *Attorney, Agent, or Firm* — Oliff PLC (57) ABSTRACT A vehicle control system is provided which includes a travel controller working to execute a coasting mode to cut transmission of drive power, as produced by an engine to a drive wheel of the vehicle when a given execution condition is encountered while the vehicle is traveling. The travel controller determines a threshold value, as used for comparison with a position of an accelerator, based on the speed of the vehicle. When the position of the accelerator is determined to be smaller than the threshold value, the travel controller executes the coasting mode. This improves the fuel economy in the vehicle without sacrificing traveling of the vehicle according to a driver's operation on the accelerator.

9 Claims, 5 Drawing Sheets

(51) Int. Cl.
*F16D 48/06* (2006.01)
*B60W 10/06* (2006.01)
*F02D 11/02* (2006.01)
*F02D 41/12* (2006.01)

(52) U.S. Cl.
CPC ............... *F16D 2500/106* (2013.01); *F16D 2500/10412* (2013.01)

(56) References Cited

U.S. PATENT DOCUMENTS

| | | | | |
|---|---|---|---|---|
| 9,026,333 | B2* | 5/2015 | Tokimasa | B60W 30/09 340/436 |
| 9,599,054 | B2* | 3/2017 | Kawamoto | F02D 41/123 |
| 2008/0312035 | A1* | 12/2008 | Murayama | B60W 30/19 477/110 |
| 2011/0066350 | A1* | 3/2011 | Sonoda | B60W 30/16 701/96 |
| 2012/0310457 | A1* | 12/2012 | Kim | B60K 6/445 701/22 |
| 2014/0373809 | A1* | 12/2014 | Kawamoto | B60W 10/06 123/332 |
| 2015/0158491 | A1* | 6/2015 | Suzuki | B60W 30/18072 701/67 |
| 2015/0329119 | A1* | 11/2015 | Sujan | B60W 30/18072 701/54 |
| 2016/0019792 | A1* | 1/2016 | Kawamata | B60R 16/0236 701/70 |

\* cited by examiner

VEHICLE SPEED [m/s]

FIG.4(b)

ENGINE SPEED [rpm]

FIG.4(c)

ACCELERATOR POSITION [%]

VEHICLE CONTROL SYSTEM

CROSS REFERENCE TO RELATED DOCUMENT

The present application claims the benefit of priority of Japanese Patent Application No. 2015-223305 filed on Nov. 13, 2015, the disclosure of which is incorporated herein by reference.

BACKGROUND

1. Technical Field

The invention relates generally to a vehicle control system for a vehicle which is equipped with an engine, such as an internal combustion engine, as a drive power source.

2. Background Art

Modern vehicle control systems are known which operate in a coasting mode which stops an engine mounted in a vehicle to cut transmission of torque, as produced by the engine, to the drive wheels of the vehicle during deceleration of the vehicle to perform a natural deceleration in order to save fuel consumed in the engine.

For example, Japanese Patent No. 5304350 teaches a vehicle control system engineered to operate in the coasting mode. The vehicle control system works to measure an inclination of a road on which the vehicle is traveling and determine whether the coasting mode should be executed or not based on the measured inclination.

Specifically, the vehicle control system, as disclosed in the above publication, makes the determination of whether the coasting mode should be entered or not only when the position of an accelerator of the vehicle is zero, that is, the accelerator is not depressed by a vehicle operator or driver. This, however, results in a limited period of time in which the coasting mode is performed, thus leading to a limited reduction in consumption of fuel in the vehicle.

SUMMARY

It is therefore an object to provide a vehicle control system which is capable of improving the fuel economy in a vehicle without sacrificing traveling of the vehicle according to a driver's operation on an accelerator.

According to one aspect of the disclosure, there is provided a vehicle control system which is used in a vehicle equipped with an engine as a drive power source and a drive wheel to which drive power, as produced by the engine, is transmittable. The vehicle control system comprises: (a) an accelerator position determiner which determines an accelerator position that is a function of an accelerating effort exerted by a driver of the vehicle on an accelerator in the vehicle; (b) a vehicle speed determiner which determines a vehicle speed that is a speed of the vehicle; and (c) a travel controller which works to execute a coasting mode to cut transmission of the drive power from the engine to the drive wheel of the vehicle when a given execution condition is encountered while the vehicle is traveling. The travel controller is engineered to determine a threshold value, as used for comparison with the accelerator position, based on the vehicle speed determined by the vehicle speed sensor. When the accelerator position is determined to be smaller than the threshold value, the travel controller enters the coasting mode.

When the vehicle is traveling on a horizontal surface, the accelerator position has a correlation with the vehicle speed. Therefore, when the driver wants to keep the vehicle speed constant, it is necessary to keep the accelerator position as it is. Alternatively, when wanting to accelerate the vehicle, the driver needs to further depress, for example, an accelerator pedal to increase the accelerator position. When the vehicle is traveling on an uphill road, and the driver wants to keep the vehicle speed constant or accelerate the vehicle, the driver usually further depress the accelerator pedal, thus resulting in an increased value of the accelerator position in relation to the vehicle speed. When the vehicle is traveling on a downhill road, it will result in a decreased degree of drive power or torque required for the engine to produce to keep the vehicle speed constant. The accelerator position will, thus, be decreased in relation to the vehicle speed. When having decided that there is no need to accelerate the vehicle, the driver usually keeps the accelerator pedal at the same position, decreases an amount by which the accelerator pedal is depressed, or releases the accelerator pedal. Specifically, in any of the above cases, when feeling that the vehicle speed is lower, the driver usually depresses the accelerator pedal to increase the accelerator position. Alternatively, when feeling that the vehicle speed is higher, the driver releases the accelerator pedal to decrease the accelerator position. The vehicle control system of this disclosure, thus, determines the threshold value using the relation between the accelerator position and the vehicle speed, as derived when the vehicle is traveling on the horizontal road surface and initiates the coasting mode when the accelerator position is determined to be smaller than the threshold value. In other words, when the driver is feeling that the vehicle is traveling at a desired speed, the vehicle control system executes the coasting mode, thereby resulting in improved consumption of fuel in the engine without sacrificing the intention of the driver of the vehicle.

In the preferred mode of the disclosure, the travel controller works to execute the coasting mode when the accelerator position is determined to be decreasing.

When the driver depresses the accelerator pedal to increase the accelerator position, it means that the driver has an intention to accelerate the vehicle. When the accelerator position is determined to be increasing, the vehicle control system stops executing the coasting mode, thus enabling the vehicle to be controlled according to a driver's intention.

The threshold value may be determined using a mathematical function which represents a correlation between the vehicle speed and the accelerator position.

In general, the correlation between the vehicle speed and the accelerator position may be expressed by a mathematical function. The threshold value for use in determining whether the coasting mode should be entered or not is derived using the function representing the correlation between the vehicle speed and the accelerator position, thereby enhancing the accuracy in determining whether the coasting mode should be initiated or not.

The threshold value may be defined as a first threshold value. The second threshold value may also be provided which is lower than the first threshold value. When the accelerator position is lower than or equal to the first threshold value and higher than the second threshold value, the travel controller may the coasting mode to set the rotational speed of the engine to a given idling speed. Alternatively, when the accelerator position is lower than or equal to the second threshold value, the travel controller may the coasting mode to stop supplying fuel to the engine.

When the driver additionally pushes the accelerator pedal 31 while pressing the accelerator pedal 31, it may accelerate the vehicle. In the above mode of the vehicle control system, when the accelerator position, as measured actually, is lower than or equal to the threshold value and higher than the second threshold value, the vehicle control system brings the vehicle speed into agreement with the idling speed, thereby achieving quick acceleration of the vehicle in response to driver's additional depression of the accelerator pedal.

When the driver is not depressing the accelerator pedal, there is a low probability that the driver suddenly re-accelerates the vehicle. In the above mode of the vehicle control system, when the driver is not pressing the accelerator pedal, so that the accelerator position is zero, the vehicle control system executes the second coasting mode which stops supplying fuel to the engine, thereby enhancing the reduction in consumption of fuel in the engine.

The vehicle control system may also include an engine speed determiner which determines a rotational speed of an output shaft of the engine as an engine speed. The travel controller may be engineered to execute the coasting mode when at least one of a rate of increase in the engine speed and an amount of increase in the engine speed is greater than or equal to a given value, at least one of a rate of decrease in the accelerator position and an amount of decrease in the accelerator position is smaller than a given value, and at least one of a rate of increase in the vehicle speed and an amount of increase in the vehicle speed is greater than or equal to a given value.

Specifically, as long as the rate of increase in engine speed and/or the amount of increase in engine speed is higher than or equal to the given value, and the rate of increase in vehicle speed and/or the amount of increase in vehicle speed is higher than or equal to the given value, when the driver decreases the amount by which the accelerator pedal is pressed to decrease the accelerator position, but the rate or amount of such decrease is lower the given value, the vehicle may be kept accelerated. Accordingly, when the above conditions are met, the vehicle control system may execute the coasting mode. In other words, the coasting mode may be entered when the vehicle has been suddenly or greatly accelerated, thereby further improving the fuel economy in the vehicle.

The vehicle control system may also include an engine speed determiner which determines a rotational speed of an output shaft of the engine as an engine speed. The travel controller may initiate the coasting mode when at least one of a rate of increase in the engine speed and an amount of increase in the engine speed is greater than or equal to a given value and at least one of a rate of decrease in the accelerator position and an amount of decrease in the accelerator position is higher than or equal to a given value.

According to the second aspect of the invention, there is provided a vehicle control system which is used in a vehicle equipped with an engine as a drive power source and a drive wheel to which drive power, as produced by the engine, is transmittable. The vehicle control system comprises: (a) an accelerator position determiner which determines an accelerator position that is a function of an accelerating effort exerted by a driver of the vehicle on an accelerator in the vehicle; (b) a vehicle speed determiner which determines a vehicle speed that is a speed of the vehicle; (c) an engine speed determiner which determines a rotational speed of an output shaft of the engine as an engine speed; and (d) a travel controller which works to execute a coasting mode to cut transmission of the drive power from the engine to the drive wheel of the vehicle when given execution conditions are encountered. The given execution conditions are conditions in which at least one of a rate of increase in the engine speed and an amount of increase in the engine speed is greater than or equal to a given value, at least one of a rate of decrease in the accelerator position and an amount of decrease in the accelerator position is smaller than a given value, and at least one of a rate of increase in the vehicle speed and an amount of increase in the vehicle speed is greater than or equal to a given value. This offers the same beneficial advantages as described above.

The vehicle control system has a clutch through which the engine is joined to the drive wheel. When the coasting mode is entered, the travel controller may control an engaged state of the clutch.

Specifically, when there is a high probability that the driver re-accelerates the vehicle, the vehicle control system may keep the clutch engaged to enhance the rate of response to a driver's request to re-accelerate the vehicle. Additionally, when the road on which the vehicle is traveling is determined to be a downhill road, the vehicle control system may keep the clutch engaged to limit undesirable acceleration of the vehicle arising from downward moving of the vehicle on the downhill road.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Referring now to the drawings, wherein like reference numbers refer to like parts throughout the several views, there is shown a vehicle control system according to an embodiment which is mounted in a vehicle, such as an automobile, equipped with an engine as a drive power source.

First Embodiment

The vehicle control system of the first embodiment is engineered to operate in a normal travel mode which places a clutch in a power transmission mode and in a coasting mode which places the clutch in a power transmission blocking mode to achieve a natural deceleration of the vehicle.

Figure 1:
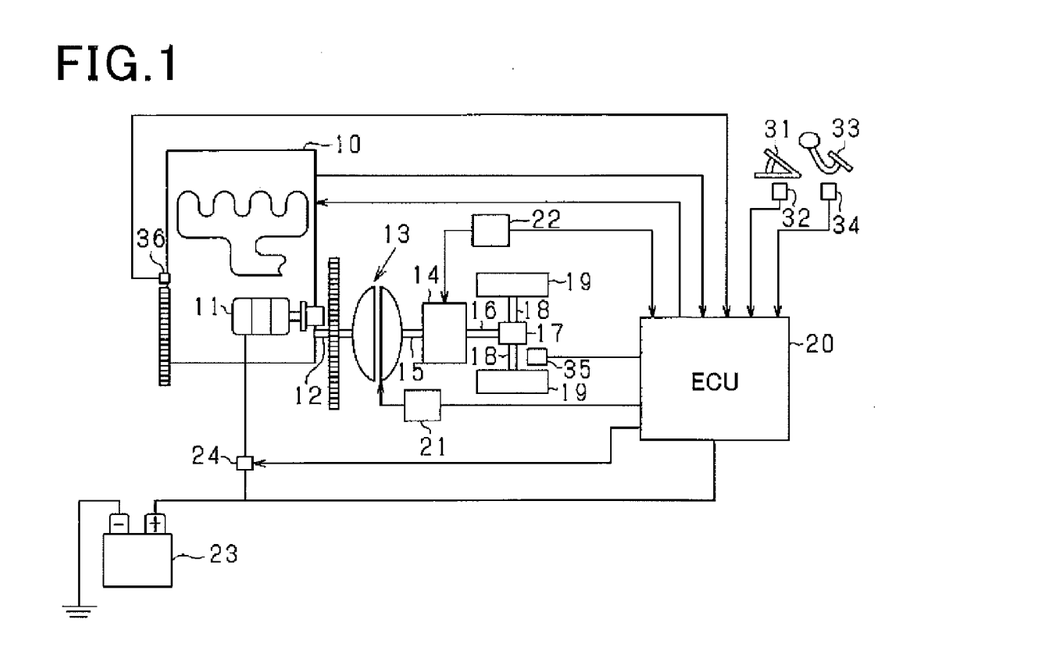
FIG. 1 is a schematic block diagram which illustrates a vehicle control system according to an embodiment.

In FIG. 1, the engine 10 is a multi-cylinder internal combustion engine in which fuel, such as gasoline or diesel oil, is combusted and which is equipped with typical fuel injectors and a typical igniter. The engine 10 has the starter motor 11 mounted thereon. The starter motor 11 has a rotational axis (i.e., an output shaft) which is connectable with the output shaft 12 (i.e., a rotational axis) of the engine 10. When it is required to start the engine 10, the rotation of the starter motor 11 is outputted as initial torque to crank the engine 10.

The output shaft 12 of the engine 10 is joined to the transmission 14 through the clutch 13. The clutch 13 is implemented by, for example, a frictional clutch which includes a pair of clutch mechanisms equipped with a disc (i.e., a flywheel) joined to the output shaft 12 of the engine 10 and a disc (i.e., a clutch disc) joined to the input shaft 15 of the transmission 14. When the discs of the clutch 13 are brought into contact with each other, the clutch 13 is placed in an engagement mode to transmit power between the engine 10 and the transmission 14. Alternatively, when the discs of the clutch 13 are disengaged from each other, the clutch 13 is placed in a disengagement mode to block the transmission of power between the engine 10 and the transmission 14. The clutch 13 of this embodiment is engineered as an automatic clutch which has, as described above, the engagement mode and the disengagement mode which are switched by an actuator such as an electrical motor. The clutch 13 may be installed inside the transmission 14.

The transmission 14 is engineered as an automatic transmission equipped with a plurality of gear ratios. The transmission 14 works to change the speed of power, as produced by the engine 10 and inputted into the input shaft 15, with a gear ratio selected as a function of the speed of the vehicle, the rotational speed of the engine 10, and the position of a shift lever (also called a selector) of the transmission 14 and outputs it from the output shaft 16. The shift lever is an operating lever of the transmission 14 and disposed near a driver's seat of the vehicle. The driver of the vehicle moves the shift lever to select one of a plurality of operating modes (i.e., the gear ratios) of the transmission 14. The transmission 14 of this embodiment has, as the positions of the shift lever, a forward position (also called a D-range), a reverse position (also called an R-range), and a neutral position (also called an N-range). The transmission 14 is equipped with an automatic shift mechanism made of an actuator such as an electric motor or a hydraulic actuator. In the D-range, the gear ratios are automatically changed from one to another. To the output shaft 16 of the transmission 14, the drive wheels 19 are joined through the differential gear 17 and the drive shaft 18. The vehicle control system of this embodiment also includes the ECU (Electronic Control Unit) 20, the clutch controller 21, and the transmission controller 22. The ECU 20 works to control an overall operation of the control system. The clutch controller 21 works to control operation of the clutch 13. The transmission controller 22 works to control operation of the transmission 14. The ECU 20, the clutch controller 21, and the transmission controller 22 are each realized by a typical electronic control device equipped with a microcomputer and monitor outputs from sensors installed in the control system to control operation of the engine 10, the clutch 13, and the transmission 14. The ECU 20, the clutch controller 21, and the transmission controller 22 are joined together so that they are communicable with each other to share control signals or data signals with each other. The ECU 20 constitutes the vehicle control system, but however, the vehicle control system may alternatively be implemented by the ECU 20, the clutch controller 21, and the transmission controller 22.

The ECU 20 is electrically connected to the storage battery 23 and operates on power supplied from the battery 23. The battery 23 is joined to the starter motor 11 through the relay 24. The relay 24 is connected or closed in response to a drive signal outputted from the ECU 20. When the relay 24 is closed, the starter motor 11 is actuated by the power delivered from the battery 23.

The above described sensors include the accelerator sensor 32, the brake sensor 34, the wheel speed sensor 35, and the rotational speed sensor 36. The accelerator sensor 32 measures an amount by which the accelerator pedal 31 is depressed, that is, the position of the accelerator pedal 31. The brake sensor 34 measures an amount by which the brake pedal 33 is depressed, that is, the position of the brake pedal 33. The wheel speed sensor 35 measures the speed of the drive wheels 19. The rotational speed sensor 36 measure the rotational speed of the output shaft 12 of the engine 10 per unit time. Outputs from these sensors are inputted into the ECU 20. The ECU 20 derives how far the accelerator pedal 31 is being depressed, that is, the position of the accelerator pedal 31, as measured by the accelerator sensor 32, as an accelerator position (i.e., an open position of a throttle valve) that is as a function of an accelerating effort exerted by the driver on the accelerator pedal 31. In the following discussion, the fact that the accelerator position is zero means that the accelerator pedal 31 is not depressed, i.e., released fully. In other words, the greater an amount by which the accelerator pedal 31 is depressed, the greater the accelerator position. The ECU 20 also derives the speed of the drive wheels 19, as measured by the wheel speed sensor 35, as a vehicle speed. The ECU 20 works as an accelerator position determiner to calculate the accelerator position using an output from the accelerator sensor 32, an engine speed determiner to determine the speed of the engine 10 using an output from the rotational speed sensor 36, and a vehicle speed determiner to calculate the vehicle speed using an output from the wheel speed sensor 35. The vehicle control system also includes other sensors (not shown).

The ECU 20 analyzes the outputs from the sensors and information inputted from the transmission controller 22 to perform control tasks such as control of the quantity of fuel to be sprayed by the fuel injectors and ignition timing of the igniter of the engine 10. The clutch controller 21 performs a switching operation to engage or disengage the clutch 13 based on information inputted from the ECU 20. Similarly, the transmission controller 22 works to change the gear ratios of the transmission 14 based on information inputted from the ECU 20.

When a given coasting condition is encountered while the vehicle of this embodiment is being driven by the drive power or torque produced by the engine 10, the vehicle control system (i.e., the ECU 20) executes a coasting mode to disengage the clutch 13, thereby saving fuel consumed in the engine 10. Specifically, the ECU 20 works as a travel controller and selectively operates in one of a first coasting mode and a second coasting mode. The first coasting mode is to control a supply of fuel to the engine 10 to adjust the speed of the engine 10 to a given idling speed and also disengage the clutch 13. The second coasting mode is to cut the supply of fuel to the engine 10 and also disengage the clutch 13.

The ECU 30 monitors the accelerator position, as measured by the accelerator sensor 32, and the vehicle speed, as measured by the wheel speed sensor 35, to determine whether the given coasting condition is encountered or not. A relation between the accelerator position and the vehicle speed will be explained below with reference to FIG. 2.

Figure 2:
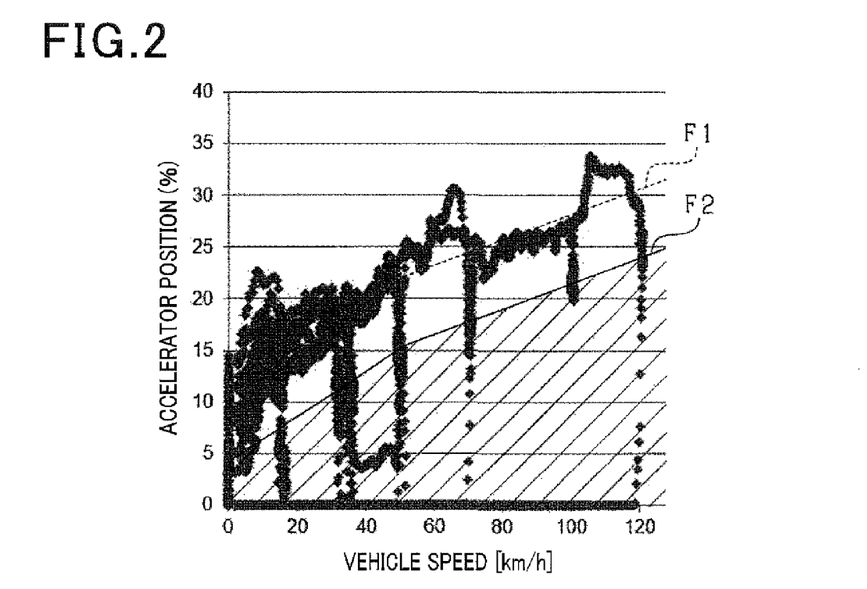
FIG. 2 is a graph which represents a relation between a vehicle sped and an accelerator position.

Usually, when the vehicle is traveling on a flat road, the gear ratio of the transmission 14 is kept constant. The accelerator position that is a function of the vehicle speed is kept constant unless the vehicle is accelerating or decelerating. A correlation between the accelerator position and the vehicle speed is, therefore, approximated by a linear function F1 represented by a broken line in FIG. 2. FIG. 2 demonstrates an example where the transmission 14 has six switchable gear ratios which are so set that the relation between the accelerator position and the vehicle speed will be changed at a point where the vehicle speed is 50 km/h and the gear is changed from the third speed to the fourth speed. The linear function F1, thus, has a coefficient which changes at a time when the vehicle speed is 50 km/h.

Consequently, when the accelerator position actually measured at a certain vehicle speed is smaller than that derived according to the linear function F, it means that the driver is not accelerating the vehicle. When the vehicle is traveling on an uphill road, and the driver wants to keep the vehicle speed constant, the driver needs to further depress the accelerator pedal 31. Therefore, when the driver has determined to need to accelerate the engine 10 or keep the vehicle speed constant, the actually measured accelerator position will become greater than that predetermined as a function of the vehicle speed. Otherwise, the actually measured accelerator position becomes smaller than that predetermined as a function of the vehicle speed. Alternatively, when the vehicle is traveling on a downhill road, and the driver has determined there is no need to accelerate the engine 10, the actually measured accelerator position will become smaller than that predetermined as a function of the vehicle speed.

Accordingly, the vehicle control system of this embodiment sets a threshold value of the accelerator position to be smaller than a value, as represented by the relation between the accelerator position and the vehicle speed when the vehicle is on a horizontal flat road. Specifically, the threshold value is calculated using a combination of a plurality of linear functions which are set in relation to the gear ratios. The linear function F2, as indicated by a solid line in FIG. 2, represents the threshold value which is selected to be smaller than a value given by an actual correlation between the vehicle speed and the accelerator position. When an actual position of the accelerator pedal 31 is smaller than or equal to the threshold value, the vehicle control system executes the coasting mode. In other words, when the driver has been determined to have no intention to accelerate the engine 10, the vehicle control system enters the coasting mode.

When the driver is now releasing the accelerator pedal 31, but the accelerator position is not zero, in other words, the accelerator pedal 31 is not yet fully released, there is a probability that the driver resumes depressing the accelerator pedal 31. Accordingly, when the accelerator position is not zero, the vehicle control system enters the first coasting mode and continues to supply fuel to the engine 10 to place the engine 10 in the idle mode of operation. Alternatively, when the accelerator position is zero, meaning that the accelerator pedal 31 has been fully released, the vehicle control system enters the second coasting mode to cut the supply of fuel to the engine 10. Actually, a time lag occurs between when the driver has fully released the accelerator pedal 31 and when the accelerator position sensor 32 actually outputs a signal indicative of the fact that the accelerator position has become zero. The vehicle control system may, therefore, alternatively be designed to execute the second coasting mode when the fact that the accelerator pedal 31 is not depressed is found using an ON-OFF switch which detects the fact that the accelerator pedal 31 is depressed or not depressed.

Figure 3:
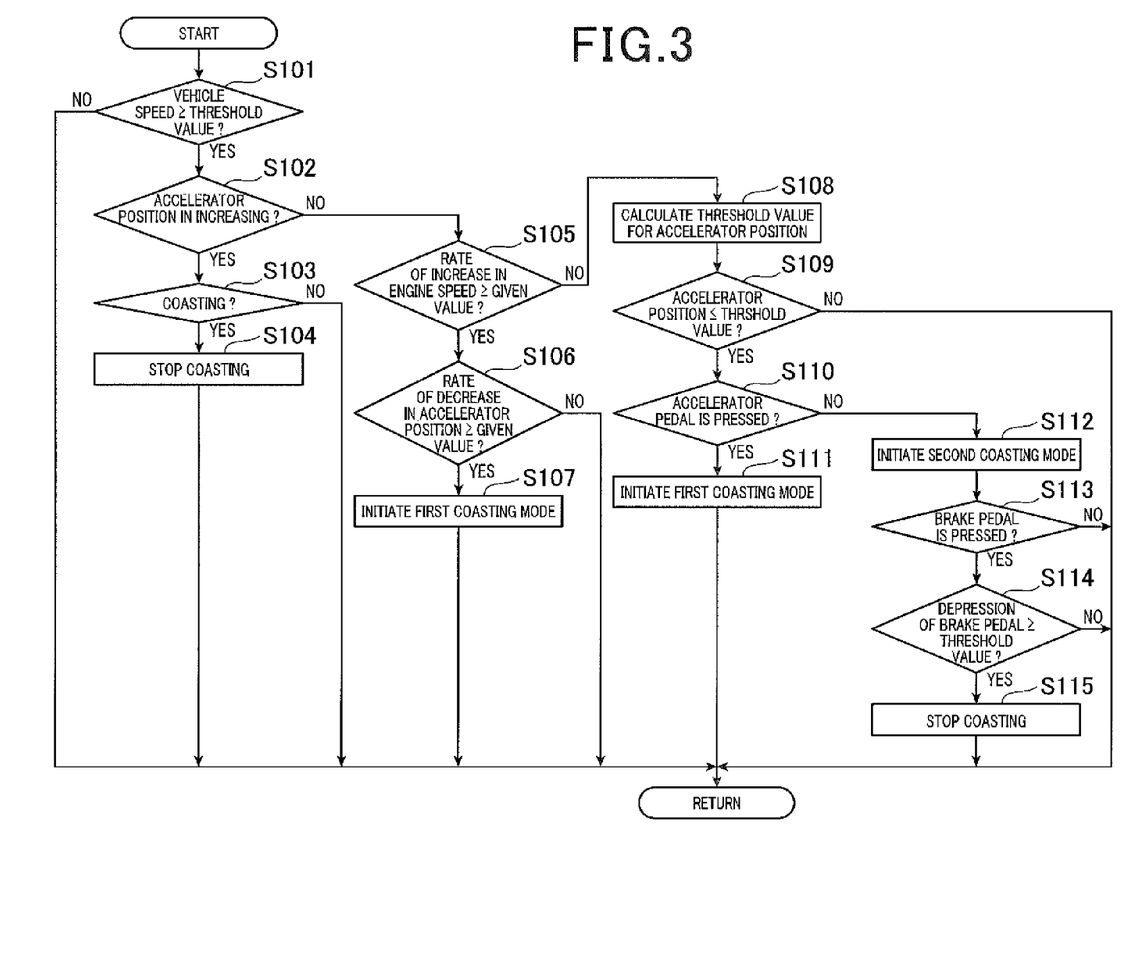
FIG. 3 is a flowchart of a coasting control program executed by the vehicle control system of FIG. 1.

A sequence of logical steps or coasting control program to be executed by the ECU 20 of the vehicle control system will be discussed below with reference to a flowchart of FIG. 3. The coasting control program of FIG. 3 is executed in a given control cycle (i.e., a program execution cycle).

After entering the program, the routine proceeds to step S101 wherein it is determined whether the speed of the vehicle (i.e., the vehicle speed), as measured by the wheel speed sensor 35, is greater than or equal to a threshold value or not. The threshold value used in step S101 is predetermined as a value for use in determining whether permission should be given to execute the coasting mode or not. The threshold value is set to several tens km/h. If a NO answer is obtained in step S101 meaning that the vehicle speed is not greater than or equal to the threshold value, in other words, the driver is stopping the vehicle or slowly operating the vehicle, so that there is no need to keep the vehicle speed constant, then the routine terminates. Alternatively, if a YES answer is obtained, then the routine proceeds to step S102 wherein the accelerator position is increasing, in other words, the accelerator pedal 31 is now being depressed or not.

Specifically, in step S102, the accelerator position, as derived one control cycle earlier, is compared with that, as derived in this control cycle. If the accelerator position calculated in this control cycle is greater than that calculated one program cycle earlier, the ECU 20 concludes that the accelerator pedal 31 is being depressed, meaning that the driver has an intention to accelerate the vehicle. Accordingly, if a YES answer is obtained in step S102, then the routine proceeds to step S103 wherein it is determined whether the vehicle is now in the coasting mode or not. If a YES answer is obtained meaning that the vehicle is in the coasting mode, then the routine proceeds to step S104 wherein the ECU 20 stops executing the coasting mode. The routine then terminates. Alternatively, if a NO answer is obtained in step S103 meaning that the vehicle is not in the coasting mode, then the routine terminates.

If a NO answer is obtained in step S102 meaning that the accelerator position is not increasing, then the routine proceeds to step S105 wherein a rate at which the engine speed is increasing is greater than or equal to a given value or not. In other words, it is determined whether the vehicle is being accelerated or not. Note that even if, after it is determined in step S105 that the rate at which the engine speed is increasing is greater than or equal to the given value, the engine speed has dropped temporarily, the vehicle may be kept accelerated. Therefore, once the rate at which the engine speed is increasing is determined to be greater than or equal to the given value, this determination is maintained in this control cycle.

If a YES answer is obtained in step S105 meaning that the rate at which the engine speed is increasing is greater than or equal to the given value, that is, that the vehicle is accelerating, then the routine proceeds to step S106 wherein a rate at which the accelerator position is decreasing is greater than or equal to a given value, that is, the driver is requesting to further accelerate the vehicle or not. If a YES answer is obtained meaning that the rate at which the accelerator position is decreasing is greater than or equal to the given value, the ECU 20 presumes that the driver has finished depressing the accelerator pedal 31 to stop accelerating the vehicle and proceeds to step S107 wherein the ECU 20 enters the first coasting mode. The routine then terminates.

Alternatively, if a NO answer is obtained in step S105 meaning that the rate at which the engine speed is increasing is lower than the given value, that is, that the rate of acceleration of the vehicle is low or the vehicle is traveling at a constant speed or decelerating, then the routine proceeds to step S108 wherein a threshold value of the accelerator position is determined as a function of the vehicle speed, as measured by the wheel speed sensor 35, for determining whether a driver's operation on the accelerator pedal 31 indicates an intention to decelerate the vehicle. Specifically, the threshold value, as calculated in step S108, is given by the above described graph of FIG. 2. Subsequently, the routine proceeds to step S109 wherein it is determined whether the accelerator position is smaller than or equal to the threshold value, as derived in step S108, or not. If a NO answer is obtained meaning that the accelerator position is not lower than the threshold value, the ECU 20 presumes that the driver keeps the accelerator position constant to cause the vehicle to travel at a constant speed or the driver is depressing the accelerator pedal 31 on an uphill road. In such a condition, the vehicle should not be decelerated. The ECU 20, thus, terminates the program without executing the coasting mode. Alternatively, if a YES answer is obtained in step S109 meaning that the accelerator position is smaller than or equal to the threshold value, then the routine proceeds to step S110 wherein it is determined whether the driver is depressing the accelerator pedal 31 or not. Specifically, it is determined in step S110 whether the accelerator position is zero or not, but may alternatively be, as already described with reference to FIG. 2, determined whether an amount by which the accelerator pedal 31 has been depressed is zero or not. If a YES answer is obtained in step S110, then the routine proceeds to step S111 wherein the first coasting mode is entered. Alternatively, if a NO answer is obtained, then the routine proceeds to step S112 wherein the second coasting mode is entered.

After the second coasting is entered in step S112, the routine proceeds to step S113 wherein it is determined whether the driver is depressing the brake pedal 33 or not. If a YES answer is obtained meaning that the driver is depressing the brake pedal 33, then the routine proceeds to step S114 wherein it is determined whether an amount by which the brake pedal 33 is depressed, that is, the position of the brake pedal 33 is greater than or equal to a given threshold value or not. If a YES answer is obtained meaning that the position of the brake pedal 33 is greater than or equal to the threshold value, it means that the driver is requiring a greater degree of braking force. The routine proceeds to step S115 wherein the second coasting mode is terminated to create the engine brake. Alternatively, if a NO answer is obtained in step S113 meaning that the brake pedal 33 is not depressed or the brake pedal 33 is depressed or a NO answer is obtained in step S114 meaning that the brake pedal 33 is depressed, but the amount by which the brake pedal 33 is depressed is lower than the threshold value, it means that the driver does not want a greater degree of braking force. The ECU 20 continues to execute the second coasting mode.

If, after the accelerator position was lowered or equal to the threshold value, that is, a YES answer was obtained in step S109 one control cycle earlier, so that the coasting mode has been initiated, the accelerator position, as derived in this control system, is determined to exceed the threshold value, YES answers are obtained in steps S102 and S103, so that the coasting mode is stopped. If the operation in step S107 or S111 is performed when the vehicle is in the first coasting modem, the ECU 20 continues the first coasting mode.

The vehicle control system of this embodiment offers the following beneficial advantages.

When the vehicle is traveling on a horizontal flat surface, the accelerator position has, as described above, a correlation with the vehicle speed. Therefore, when the driver wants to keep the vehicle speed constant, it is necessary to keep the accelerator position as it is. Alternatively, when wanting to accelerate the vehicle, the driver needs to further depress the accelerator pedal 31 to increase the accelerator position. When the vehicle is traveling on an uphill road, and the driver wants to keep the vehicle speed constant or accelerate the vehicle, the driver usually further depresses the accelerator pedal 31, thus resulting in an increased value of the accelerator position in relation to the vehicle speed. When the vehicle is traveling on a downhill road, it will result in a decreased degree of drive power or torque, as produced by the engine 10, which is required to keep the vehicle speed constant. The accelerator position will, thus, be decreased in relation to the vehicle speed. When having decided that there is no need to accelerate the vehicle, the driver usually decreases an amount by which the accelerator pedal 31 is depressed or releases the accelerator pedal 31. Specifically, in any of the above cases, when feeling that the vehicle speed is lower than a desired one, the driver depresses the accelerator pedal 31 to increase the accelerator position. Alternatively, when feeling that the vehicle speed is higher, the driver releases the accelerator pedal 31 to decrease the accelerator position. The vehicle control system of this embodiment, thus, determines the threshold value using a relation between the accelerator position and the vehicle speed, as derived when the vehicle is traveling on a horizontal road surface and initiates the coasting mode when the accelerator position, as derived by the accelerator sensor 32, is determined to be smaller than the threshold value. In other words, when the driver is feeling that the vehicle is traveling at a desired speed, the vehicle control system executes the coasting mode, thereby resulting in improved consumption of fuel in the engine 10 without sacrificing the intention of the driver of the vehicle.

The correlation between the accelerator position and the vehicle speed when the vehicle is traveling on a horizontal road surface is, as described above, expressed by a liner function. In this embodiment, the threshold value for use in determining whether the coasting mode should be entered or not is determined according to the linear function, thereby enhancing the accuracy of determination of whether the coasting mode should be executed or not.

When the driver additionally pushes the accelerator pedal 31 while pressing the accelerator pedal 31, it may accelerate the vehicle. In this embodiment, when the accelerator position, as measured actually, is lower than or equal to the threshold value, and the driver is depressing the accelerator pedal 31, the vehicle control system executes the first coasting mode which does not cut the supply of fuel to the engine 10, thereby enabling the vehicle to be accelerated quickly in response to driver's additional depression of the accelerator pedal 31.

When the driver is not depressing the accelerator pedal 31, there is a low probability that the driver suddenly re-accelerates the vehicle. In this embodiment, when the driver is not pressing the accelerator pedal 31, so that the accelerator position is zero, the vehicle control system executes the second coasting mode which stops supplying fuel to the engine 10, thereby enhancing the reduction in consumption of fuel in the engine 10.

The driver's depression of the brake pedal 33 means that the driver is just decelerating the vehicle. Based on this fact, the vehicle control system works to suspend the coasting mode in response to the depression of the brake pedal 33, thereby causing the engine brake to be created when the driver has been determined to have an intention to decelerate the vehicle.

Second Embodiment

The vehicle control system of this embodiment is different from that of the first embodiment in determination of whether the coasting mode should be entered or not.

Figure 4A:
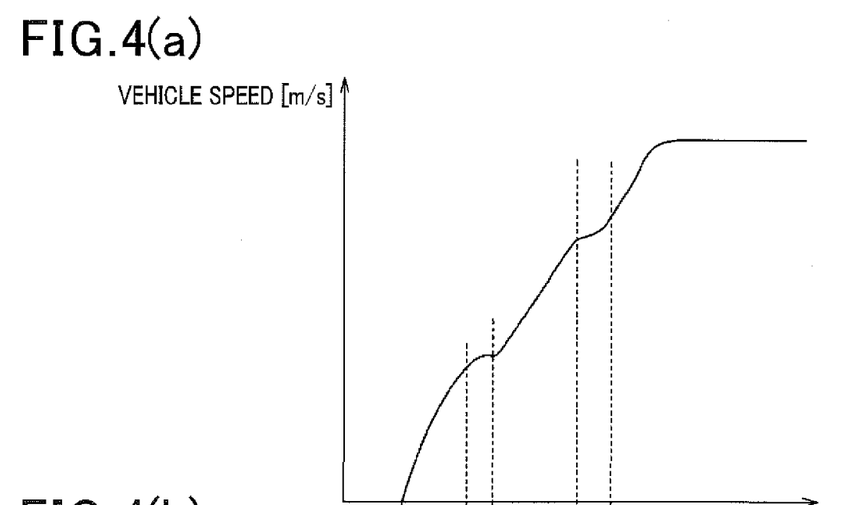
FIG. 4(a) is a time chart which demonstrates a rise in vehicle speed when a vehicle is accelerated.
Figure 4B:
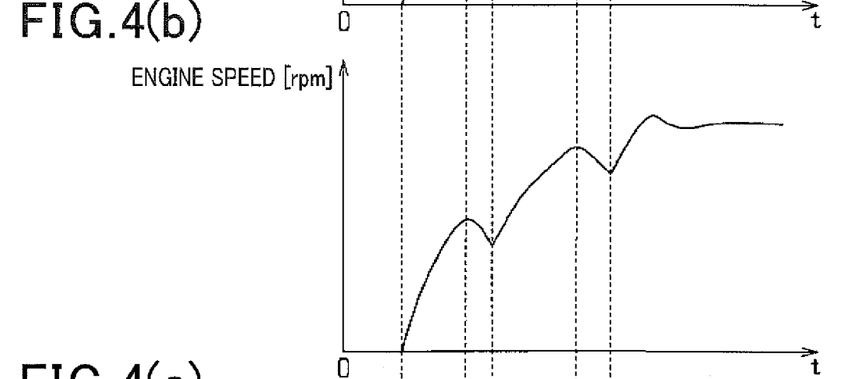
FIG. 4(b) is a time chart which demonstrates a rise in engine speed when a vehicle is accelerated.
Figure 4C:
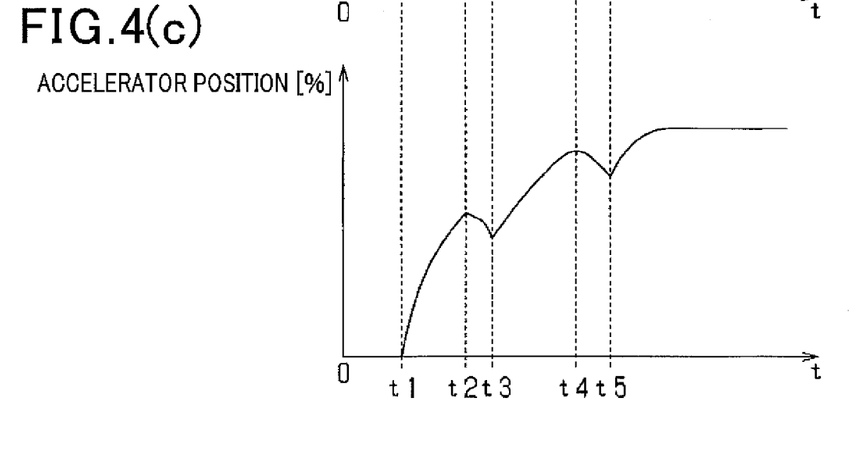
FIG. 4(c) is a time chart which demonstrates a rise in accelerator position when a vehicle is accelerated.

FIGS. 2(a), 2(b), and 2(c) demonstrate the speed of the vehicle, the rotational speed of the engine 10, and the position of the accelerator pedal 31, respectively, when the driver greatly press the accelerator pedal 31 to rapidly accelerate the vehicle. When the driver, as illustrated in FIG. 4(c), depresses the accelerator pedal 31 at time t1, it will cause the vehicle speed and the engine speed, as illustrated in FIGS. 4(a) and 4(b), to be increased. When the driver slightly releases the accelerator pedal 31, that is, an amount by which the accelerator pedal 31 is depressed is decreased at time t2, it will cause the engine speed to be decreased. The transmission controller 22 works to control the gear changing operation of the transmission 14. When the degree of acceleration of the vehicle is sufficiently high at time t2, it will cause the vehicle to continue to accelerate with aid of the inertia of the vehicle, as developed when the vehicle is being accelerated. When the driver increases an amount by which the accelerator pedal 31 is depressed at time t3, the speed of the vehicle will be increased. The same applies for a period of time between time t4 and time t5.

The execution of the coasting mode in a period of time between time t2 and time t3 or between time t4 and t5 in which the driver decreases the degree of depression of the accelerator pedal 31 serves to improve the fuel efficiency in the engine 10 without adverse effects on acceleration of the vehicle. Accordingly, the vehicle control system of this embodiment is engineered to initiate the coasting mode when the rate of increase in the vehicle speed is greater than or equal to a given value, the rate of increase in the engine speed is greater than or equal to a given value, and the rate of decrease in the accelerator position is lower than or equal to a given value. The coasting mode performed when such conditions are met is the first coasting mode to keep the engine 10 at an idling speed.

Figure 5:
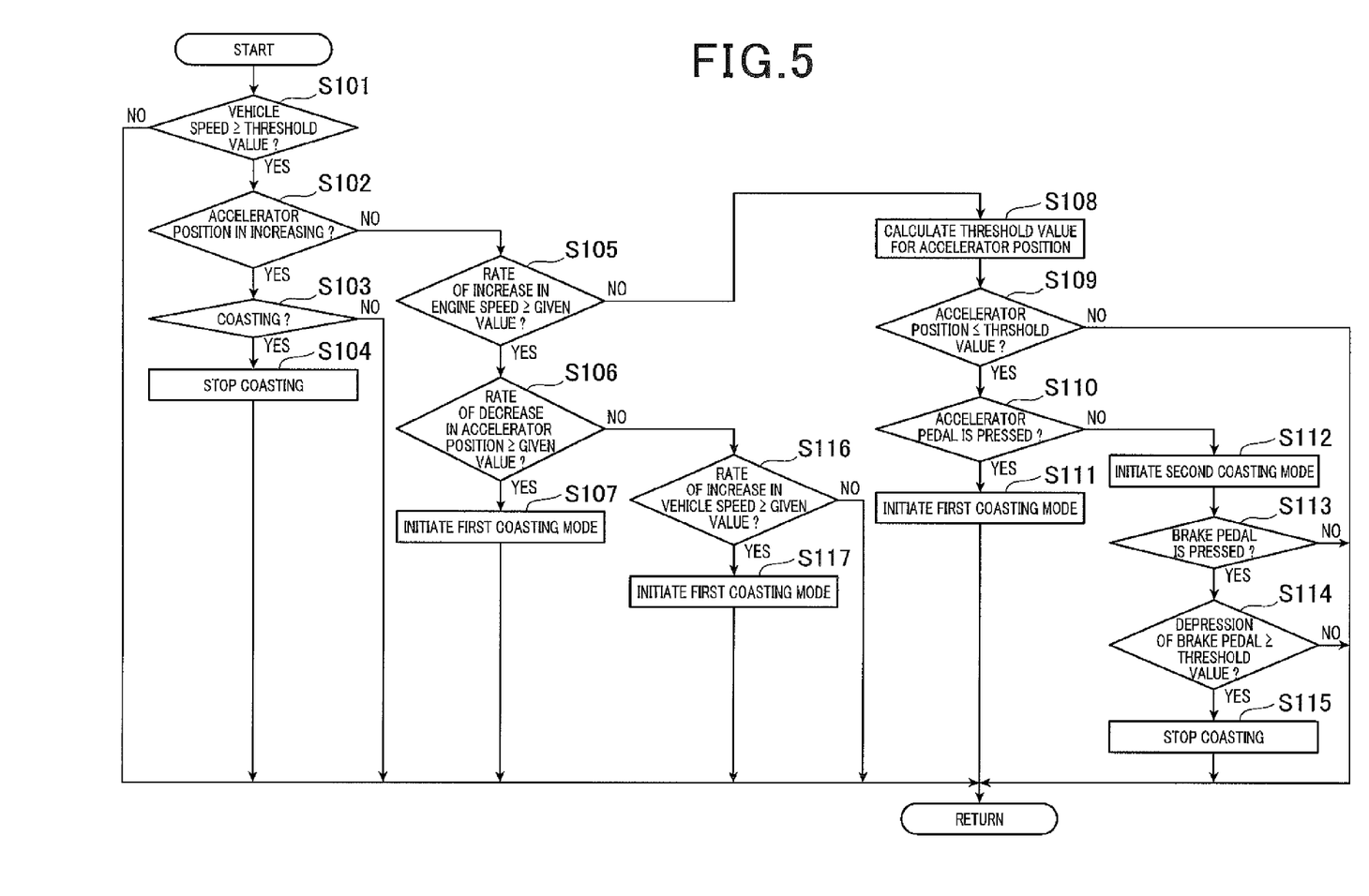
FIG. 5 is a flowchart of a coasting control program executed by a vehicle control system in the second embodiment.

FIG. 5 shows a sequence of logical steps or coasting control program to be executed by the ECU 20 of the vehicle control system in the second embodiment. The coasting control program of FIG. 5 is executed in a given control cycle (i.e., a program execution cycle).

The operations in steps S101 to S115 are the same as those in FIG. 3 of the first embodiment, and explanation thereof in detail will be omitted here. If a YES answer is obtained in step S105 meaning that a rate of increase in the engine speed is greater than or equal to the given value, and a NO answer is obtained in step S106 meaning that the rate of decrease in the accelerator position is smaller than the given value, there is a probability that the vehicle is kept accelerated for a while even if the coasting mode is executed because the depression of the accelerator pedal 31 to start the vehicle may cause the vehicle to be greatly accelerated. Therefore, in order to determine whether the vehicle will be kept accelerated even if the coasting mode is entered, if a NO answer is obtained in step S106, then the routine proceeds to step S116 wherein it is determined whether the rate of increase in the vehicle speed (i.e., the acceleration of the vehicle) is higher than or equal to a given value or not. If a YES answer is obtained meaning that the rate of increase in the vehicle speed is higher than or equal to the given value, that is, the vehicle will be kept accelerated even if the coasting mode is executed, then the routine proceeds to step S117 wherein the first coasting mode is initiated. Alternatively, if a NO answer is obtained in step S116, then the routine terminates.

The flowchart of FIG. 5 has steps S108 to S115 which are executed when the rate of increase in the engine speed is smaller than the given value, but however, they may be omitted.

The vehicle control system of the second embodiment offers the following beneficial advantages.

When the rate of increase in speed of the engine 10 is greater than or equal to the given value, and the rate of increase in speed of the vehicle is greater than or equal to the given value, the vehicle is, as described above, enabled to be kept accelerated as long as the driver decreases the amount by which the accelerator pedal 31 is depressed to decrease the accelerator position, but the rate of such decrease is lower than or equal to the given value. The vehicle control system of this embodiment is, thus, engineered so that when the above conditions are met, the first coasting mode is entered. In other words, the vehicle control system works to execute the coasting mode when the vehicle is suddenly accelerated, thus further improving the consumption of fuel in the engine 10.

Modifications

The linear function F2 in FIG. 2, as already described, includes two segments: a first linear function when the speed of the vehicle is less than 50 km/h and a second linear function when the speed of the vehicle is more than 50 km/h. Using a combination of the first and second linear functions, the threshold value of the accelerator position in relation to the vehicle speed is determined, but may alternatively be set using a single linear function or a combination of three or more linear functions.

The threshold value of the accelerator position in relation to the vehicle speed may be changed as a function of a selected one of the gear ratios of the transmission 14. The transmission 14, as already described with reference to FIG. 2, has the six gear ratios. The threshold value may, thus, be determined using a combination of six linear functions which are different in coefficient from each other. The transmission 14 may be engineered as a continuously variable transmission. In this case, the threshold value is determined using an approximate linear line or an approximate curve which represents a relation between the vehicle speed and the accelerator position.

The clutch 13 is, as described above, disposed between the output shaft 12 of the engine 10 and the transmission 14. The clutch 13 is disengaged when the coasting mode is entered. The clutch 13 may additionally or alternatively be installed between the transmission 14 and the drive wheels 19 and disengaged upon entry to the coasting mode. This results in a decrease in traveling resistance of the vehicle.

The vehicle control system, as described above, terminates the coasting mode when the degree or amount of depression of the brake pedal 33 (i.e., a braking effort) is greater than or equal to the threshold value, but may alternatively be designed to terminate the execution of the coasting mode when a rate of increase in depression of the brake pedal 33 (i.e., a rate of increase in the braking effort)

per unit time is greater than or equal to a given threshold value or when at least one of the braking effort and the rate of increase in braking effort per unit time is greater than or equal to a given threshold value.

The vehicle control system may be designed to stop the coasting mode when, after the accelerator position has decreased below a given threshold value during the execution of the coasting mode, the depression of the brake pedal 33 (i.e., the braking effort) is made within a given period of time. Such a condition represents the fact that the driver has stopped depressing the accelerator pedal 31 and then started operating the brake pedal 33. The stopping of the coasting mode develops the engine braking, thus enabling the vehicle to be decelerated according to a driver's intention.

The vehicle control system, as described above, works to execute the first coasting mode when the accelerator position is lower than or equal to the given threshold value and higher than zero and alternatively execute the second coasting mode when the accelerator position is zero. The vehicle control system may alternatively be engineered to initiate the first coasting mode when the accelerator position is lower than or equal to a given first threshold value and higher than a given second threshold value that is smaller than the first threshold value and alternatively initiate the second coasting mode when the accelerator position is lower than or equal to the second threshold value. The threshold value, as referred to in the first embodiment, may be set as the first threshold value, while zero may be set as the second threshold value.

The vehicle control system of the second embodiment, as described above, works to execute the coasting mode when the rate of increase in speed of the engine 10 is higher than or equal to the given value (step S105) and/or when the rate of increase in speed of the vehicle is higher than or equal to the given value (step S116), but however, a determination of whether the rotational speed of the engine 10 is higher than or equal to a given value may be made instead of or in addition to the determination in step S105. If a YES answer is obtained meaning that the rotational speed of the engine 10 is higher than or equal to the given value, then the routine proceeds to step S106. The vehicle control system may also be designed to determine whether the coasting mode should be executed or not using an amount of increase in rotational speed of the engine 10 between this control cycle of the program in FIG. 5 and one or two or more control cycles earlier (step S105) or an amount of increase in speed of the vehicle between this control cycle of the program in FIG. 5 and one or two or more control cycles earlier (step S116). Alternatively, the determination of whether the coasting mode should be executed or not may be made using a determination of whether an amount of decrease in the accelerator position is higher than or equal to a given value or not instead of or in addition to the determination in step S106.

Figure 6:
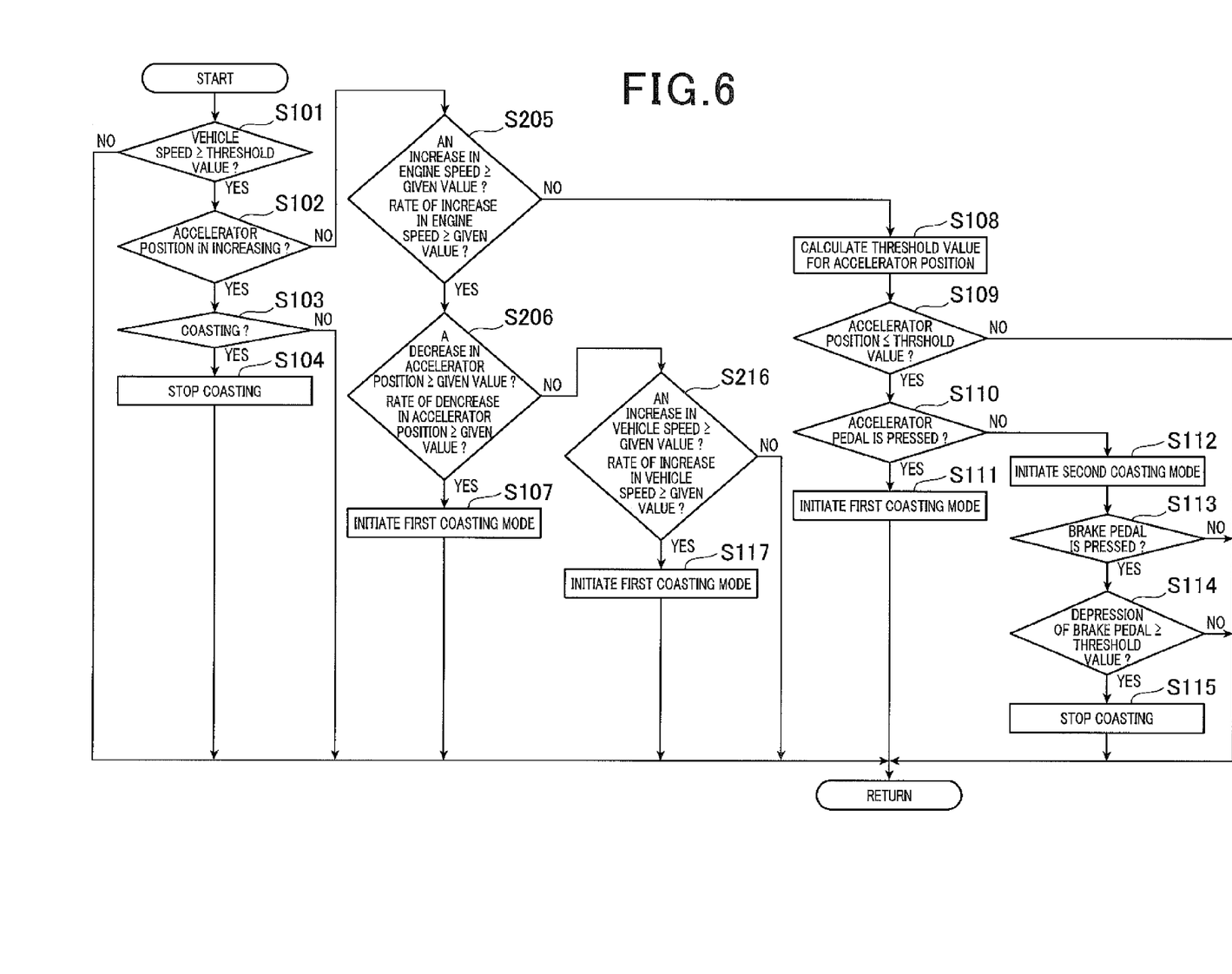
FIG. 6 is a flowchart of a coasting control program that is a modification of the one of FIG. 5.

FIG. 6 is a flowchart of a coasting control program which realizes the above described modification of the second embodiment. The same step numbers, as employed in FIG. 5, refer to the same operations, and explanation thereof in detail will be omitted here.

After a NO answer is obtained in step S102 meaning that the accelerator position is increasing, the routine proceeds to step S205 wherein it is determined whether two conditions: a first condition and a second condition are met or not. The first condition is a condition where an amount of increase in engine speed per unit time is higher than or equal to a given value. The second condition is a condition where the rate of increase in engine speed per unit time is higher than or equal to a given value. If a NO answer is obtained meaning that both the first and second conditions are not satisfied, then the routine proceeds to step S108. Alternatively, if a YES answer is obtained meaning that the amount of increase in engine speed per is higher than or equal to the given value, and the rate of increase in engine speed is higher than or equal to the given value, then the routine proceeds to step S206 wherein it is determined whether two conditions: a first condition and a second conditions are met or not. The first condition is a condition where an amount of decrease in the accelerator position per unit time is higher than or equal to a given value. The second condition is a condition where the rate of decrease in the accelerator position per unit time is higher than or equal to a given value. If a YES answer is obtained in step S206 meaning that the first and second conditions are both satisfied, then the routine proceeds to step S107 to execute the first coasting mode. Alternatively, if a NO answer is obtained meaning that the amount of decrease in the accelerator position is lower than the given value, and the rate of decrease in the accelerator position is lower than the given value, then the routine proceeds to step S216 wherein it is determined whether two conditions: a first condition and a second condition are both met or not. The first condition is a condition where an amount of increase in speed of the vehicle per unit time is higher than or equal to a given value. The second condition is a condition where the rate of increase in speed of the vehicle is higher than or equal to a given value. If a NO answer is obtained, then the routine terminates. Alternatively, if a YES answer is obtained meaning that the amount of increase in speed of the vehicle is higher than or equal to the given value, and the rate of increase in speed of the vehicle is higher than or equal to the given value, then the routine proceeds to step S117 to execute the first coasting mode. In each of steps S205, 206, and 216, if at least one of the first and second conditions is met, a YES answer may be obtained.

In summary, when at least one of the rate of increase in the engine speed and the amount of increase in the engine speed is higher than or equal to the given value, and at least one of the rate of decrease in the accelerator position and the amount of decrease in the accelerator position is higher than or equal to the given value, the vehicle control system initiates the coasting mode (i.e., the first coasting mode in step S107).

When at least one of the rate of increase in the engine speed and the amount of increase in the engine speed is higher than or equal to the given value, at least one of the rate of decrease in the accelerator position and the amount of decrease in the accelerator position is lower than the given value, and at least one of the rate of increase in the vehicle speed and the amount of increase in the vehicle speed is higher than or equal to the given value, the vehicle control system initiates the coasting mode (i.e., the first coasting mode in step S117).

The vehicle control system of the first embodiment, as described above, disengages the clutch 13 to execute the coasting mode (i.e., the first and second coasting modes), but may alternatively be designed to keep the clutch 13 engaged when the coasting mode is required to be entered. When the vehicle is traveling on a downhill road, the disengagement of the clutch 13 may result in a risk that the vehicle is unintentionally accelerated. In order to alleviate this problem, the vehicle control system may be engineered to determine whether the speed of the vehicle is increasing or not and/or whether the rate of increase in speed (i.e., an acceleration) of the vehicle is increasing or not upon the comparison of the accelerator position with the threshold value to determine whether the coasting mode should be entered or not, and engage the clutch 13 when the speed of the vehicle has been determined to be increasing and/or the rate of increase in speed of the vehicle has been determined to be increasing, thereby eliminating a undesirable further increase in speed of the vehicle. Additionally, when it is determined that there is a high probability that the driver re-accelerates the vehicle, the vehicle control system may keep the clutch 13 engaged to improve the rate of response to a re-accelerating request made by the driver.

When the driver disengages his or her foot from the accelerator pedal 31 and then immediately presses the brake pedal 33, there is a probability that the brake sensor 34 detects the depression of the brake pedal 33 before the accelerator position becomes zero. Such an event means that the driver wants to rapidly decelerate the vehicle. In view of this, the vehicle control system may be designed to measure the length of time from when the driver starts releasing the accelerator pedal 31, so that the accelerator position is decreased, to when the driver starts depressing the brake pedal 33, and to prohibit the coasting from being entered when the measured time is shorter than or equal to a given value, thereby causing the engine brake to be created when the driver is thought of as wanting to rapidly decelerate the vehicle to achieve a desired degree of deceleration of the vehicle.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A vehicle control system which is used in a vehicle equipped with an engine as a drive power source and a drive wheel to which drive power, as produced by the engine, is transmittable, comprising:
   an accelerator position determiner which determines a non-zero accelerator position that is a function of an accelerating effort exerted by a driver of the vehicle on an accelerator in the vehicle;
   a vehicle speed determiner which determines a vehicle speed that is a speed of the vehicle; and
   a travel controller which works to execute a coasting mode to cut transmission of the drive power from the engine to the drive wheel of the vehicle when a given execution condition is encountered while the vehicle is traveling, the travel controller being engineered to determine a threshold value, as used for comparison with the non-zero accelerator position, based on the vehicle speed determined by the vehicle speed sensor, when the non-zero accelerator position is determined to be smaller than the threshold value, the travel controller executing the coasting mode.

2. A vehicle control system as set forth in claim 1, wherein the travel controller executes the coasting mode when the non-zero accelerator position is decreasing.

3. A vehicle control system as set forth in claim 1, wherein the threshold value is determined using a function which represents a correlation between the vehicle speed and the non-zero accelerator position.

4. A vehicle control system as set forth in claim 1, wherein the threshold value is defined as a first threshold value, and a second threshold value is also provided which is lower than the first threshold value, and wherein when the non-zero accelerator position is lower than or equal to the first threshold value and higher than the second threshold value, the travel controller executes the coasting mode to set the rotational speed of the engine to a given idling speed, while when the non-zero accelerator position is lower than or equal to the second threshold value, the travel controller executes the coasting mode to stop supplying fuel to the engine.

5. A vehicle control system as set forth in claim 1, further comprising an engine speed determiner which determines a rotational speed of an output shaft of the engine as an engine speed, and wherein the travel controller executes the coasting mode when at least one of a rate of increase in the engine speed and an amount of increase in the engine speed is greater than or equal to a given value, at least one of a rate of decrease in the non-zero accelerator position and an amount of decrease in the non-zero accelerator position is smaller than a given value, and at least one of a rate of increase in the vehicle speed and an amount of increase in the vehicle speed is greater than or equal to a given value.

6. A vehicle control system as set forth in claim 1, wherein the engine is joined to the drive wheel through a clutch, and wherein when the coasting mode is entered, the travel controller controls an engaged state of the clutch.

7. A vehicle control system as set forth in claim 1, further comprising an engine speed determiner which determines a rotational speed of an output shaft of the engine as an engine speed, and wherein the travel controller initiates the coasting mode when at least one of a rate of increase in the engine speed and an amount of increase in the engine speed is greater than or equal to a given value and at least one of a rate of decrease in the non-zero accelerator position and an amount of decrease in the non-zero accelerator position is higher than or equal to a given value.

8. A vehicle control system which is used in a vehicle equipped with an engine as a drive power source and a drive wheel to which drive power, as produced by the engine, is transmittable, comprising:
   an accelerator position determiner which determines an accelerator position that is a function of an accelerating effort exerted by a driver of the vehicle on an accelerator in the vehicle;
   a vehicle speed determiner which determines a vehicle speed that is a speed of the vehicle; an engine speed determiner which determines a rotational speed of an output shaft of the engine as an engine speed; and
   a travel controller which works to execute a coasting mode to cut transmission of the drive power from the engine to the drive wheel of the vehicle when given execution conditions are encountered, the given execution conditions being conditions in which at least one of a rate of increase in the engine speed and an amount of increase in the engine speed is greater than or equal to a given value, at least one of a rate of decrease in the accelerator position and an amount of decrease in the accelerator position is smaller than the given value, and at least one of a rate of increase in the vehicle speed and an amount of increase in the vehicle speed is greater than or equal to the given value.

9. A vehicle control system as set forth in claim 8, wherein the engine is joined to the drive wheel through a clutch, and wherein when the coasting mode is entered, the travel controller controls an engaged state of the clutch.

* * * * *